(12) United States Patent
Lin et al.

(10) Patent No.: US 10,591,671 B2
(45) Date of Patent: Mar. 17, 2020

(54) LOW BACK-REFLECTION TAPER COUPLER

(71) Applicant: Intel Corporation, Santa Clara, CA (US)

(72) Inventors: Wenhua Lin, Fremont, CA (US); Kimchau N. Nguyen, Los Gatos, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/235,833

(22) Filed: Dec. 28, 2018

(65) Prior Publication Data

US 2019/0137688 A1 May 9, 2019

(51) Int. Cl.
*G02B 6/122* (2006.01)
*G02B 6/26* (2006.01)
*G02B 6/12* (2006.01)

(52) U.S. Cl.
CPC ......... *G02B 6/1228* (2013.01); *G02B 6/1225* (2013.01); *G02B 6/262* (2013.01); *G02B 2006/1213* (2013.01); *G02B 2006/12061* (2013.01); *G02B 2006/12121* (2013.01); *G02B 2006/12147* (2013.01)

(58) Field of Classification Search
CPC ..................................................... G02B 6/1228
See application file for complete search history.

(56) References Cited

U.S. PATENT DOCUMENTS

| | | | |
|---|---|---|---|
| 2016/0011371 A1* | 1/2016 | Vermeulen | G02B 6/1228 385/14 |
| 2016/0377809 A1* | 12/2016 | Yang | G02B 6/14 385/28 |
| 2018/0031764 A1* | 2/2018 | Lealman | H01S 5/026 |
| 2019/0146153 A1* | 5/2019 | Park | G02B 6/1228 385/43 |

* cited by examiner

*Primary Examiner* — Sung H Pak
(74) *Attorney, Agent, or Firm* — Schwabe, Williamson & Wyatt, P.C.

(57) ABSTRACT

Some embodiments of the present disclosure describe an apparatus for III/V-Si taper coupling, including a III/V-Si taper coupler with one end to receive a laser beam where the one end has at least one surface at a non-perpendicular angle with respect to a direction of the laser beam, and where the at least one surface forms one or more tips at the one end of the III/V-Si taper coupler. The one end is positioned so that the one or more tips are outside the laser beam to reduce reflection of laser beam away from the one end of the III/V-Si taper coupler.

20 Claims, 4 Drawing Sheets

LOW BACK-REFLECTION TAPER COUPLER

FIELD

Embodiments of the present disclosure generally relate to the field of interconnection structures, such as silicon photonics integrated circuits and semiconductor optical amplifiers, and more particularly, to taper couplers at a silicon (Si) to III-V interface.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

High output power and high gain semiconductor optical amplifiers (SOA) integrated on heterogeneous III-V/Si photonics platform is becoming an important component for many kinds of transmit (Tx) and receive (Rx) photonics integrated circuits (PIC). These SOAs amplify optical output power and maintain signal levels as the light/laser signal propagates throughout a large number of optical components.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings. As submitted, certain of the drawings place components in a same location and with a same view on successive pages; thus, it may be possible to view successive pages which, together, graphically illustrate a result of fabrication steps.

DETAILED DESCRIPTION

Some embodiments of the present disclosure describe an apparatus for laser coupling, comprising a tapered coupler with one end to receive a laser beam where the one end has at least one surface at a non-perpendicular angle with respect to a direction of the laser beam, and where the at least one surface forms one or more tips at the one end of the laser coupler. Furthermore, the one end is positioned so that the one or more tips are outside the laser beam to reduce reflection of laser beam away from the one end of the taper coupler.

The high output power and high gain semiconductor optical amplifiers (SOA) integrated on heterogeneous III-V/Silicon photonics platforms are becoming an important component for many kinds of Tx and Rx PICs. SOA has a number of emerging uses, such as in highly integrated switch input/output (I/O), beam-steering light detection and ranging (LIDAR), widely-tunable lasers for wavelength division multiplexing transmission, coherent Tx/Rx, and free-space optical communications.

For example, for Tx PICs, the on-die SOA may typically be set with high gain and amplifies the optical power in transmission. In legacy implementations, they may also amplify the back reflections from III/V to Si interfaces and from other on-chip components. The amplified back reflections could lead to severe degradation in the laser relative intensity noise (RIN) at the relaxation oscillation frequency of the unperturbed laser, laser amplified spontaneous emission (ASE), laser side-mode suppression ratio, and transmitter bit error rate (BER) floor generation.

Similarly, for Rx PICs, the on-die SOA may be used to pre-amp the optical power before reaching a photodetector. As a result, the SOA may amplify the back reflections from III/V to Si interfaces, leading to the degradation of optical signal to noise ratio (OSNR), multi-path interference penalty and additional noise at a high speed receiver.

Therefore, there is a benefit when the SOA incorporates a low loss and low reflection transition between the active region and a silicon waveguide. Due to the lithographic limits in CMOS fabrication, Si to III-V taper transition has a finite width (typically 0.6 μm design rule) for process manufacturing. This taper width may generate high back-reflection due to the optical mode and refractive index mismatch at the interfaces.

In an effort to suppress back reflections from a bonded taper from a Si waveguide to III-V material, several legacy approaches have been implemented, such as an angled taper coupler, a wide in silicon rib waveguide, and two-stage taper segments. With respect to an angled taper coupler, where the II-V material is angled to approximately 7 to 15° with respect to a plane perpendicular to the laser beam, small back-reflection improvement is observed at a risk of increased coupling loss, which could increase the amplifier gain ripple and increased the bias current of the SOA. With respect to the widened Si rib waveguide, where the Si rib may be widened to greater than a few micrometers (μm) to make it less sensitive to finite III-V indium phosphide (InP) taper width, these legacy implementations may require the Si rib width to be widened to 2 μm to minimize the back reflection from the III-V taper tip width, which risks multimode excitation effect and increases the non-adiabatic coupling loss. The wider silicon waveguide supports both the fundamental mode and higher-order modes. When a taper is used to transfer the fundamental mode from a wide silicon waveguide to the III-V material, it is easy to excite high-order mode for a wider Si, and the excitation of high order modes (HOM) leads to the non-adiabatic loss.

Finally, with respect to two-stage taper segments, where multiple tapers are used to transit from III-V to Si, this approach may require extra masks and complex processes to align the multiple-stage tapers, requiring a long time to develop processes to accomplish this.

Embodiments described herein may address taper coupler that facilitates a reduced mode mismatch at the Si/III-V by shifting the tip of the taper coupler so that the laser beam that travels along the Si waveguide (or rib) does not strike the tip. In embodiments, this shifting may be referred to as aligning or positioning the tip, or one or more tips, so that the laser beam does not strike them. Implementation of these embodiments adiabatically couple the light from the Si rib to III-V, with suppressed low back reflection. It maintains a continuous non-zero taper width dimension, the same Si rib width and requires no process change in III-V taper mesa and etching process. Optimization of taper coupler tip width shifts and taper length in asymmetrical or symmetrical-double taper structures.

In embodiments, taper couplers shifts the taper coupler tip from Si rib waveguide center, so as to create a tipless taper to adiabatically couple the light from Si rib to III-V (lower loss), with suppressed low back reflection. The tipless taper coupler still has a continuous non-zero taper width dimension (0.6 µm), the same silicon rib width (1 µm), but it enables a reduced mode mismatch (lower loss) at Si-III/V interface through an optimal shift of the taper tip. In embodiments, elimination of the tip may enable the mode mismatch to vanish.

When implemented, these embodiments may suppress the amplified back-reflections from the boned SOA to the hybrid laser, which may be fabricated on the SOI wafers through silicon photonics integration. These embodiments may help to reduce the laser power, hence improve laser reliability, and reduce the power consumption. To leverage the benefits of silicon photonics infrastructure, such a design should be scalable to large wafer sizes, with no extra process steps and mask layer needed, enabling high yield and low cost.

More recently, the addition of III-V semiconductor material, particularly InP, to SOI wafers through the same heterogeneous integration has expanded the suite of components to include hybrid laser, SOA, electro-absorption and electro-optic modulators (EAM), and high power photodetectors.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation relative to an acceleration field.

The description may use the phrases "in an embodiment," or "in embodiments," or "in some embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in physical or electrical contact and/or that two or more elements are optically coupled. An optical couple may comprise a gap; the gap comprise a vacuum or be filled with air, a liquid, a transmissive solid, or the like. "Coupled" may also mean that two or more elements indirectly contact each other, but yet still cooperate or interact with each other. As used herein, "optical" and formatives should not be understood to be limited to visible electromagnetic radiation, but should be understood to include any electromagnetic radiation.

Figure 1:
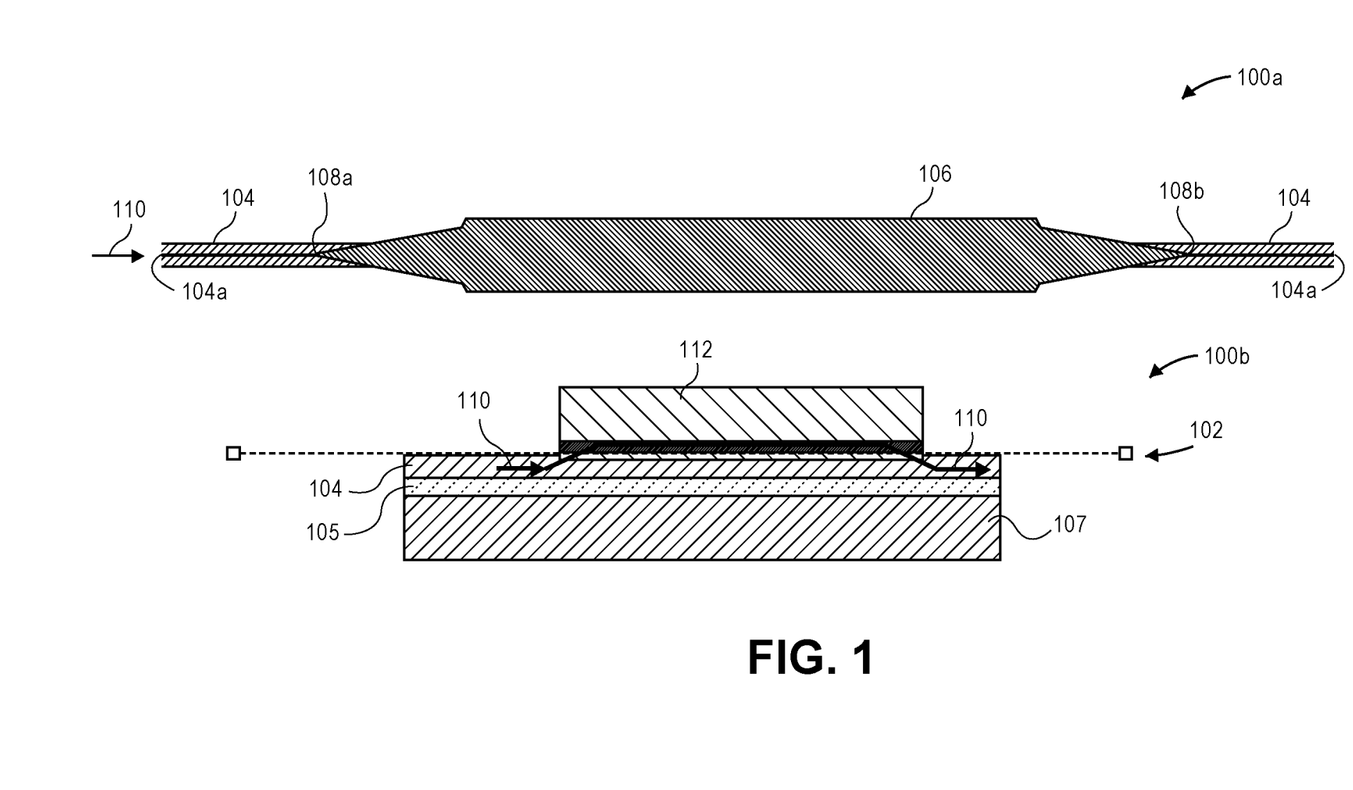
FIG. 1 illustrates an example top down and side view of a Si/III-V coupler, in accordance with some embodiments.

FIG. 1 illustrates an example top down and side view of a Si/III-V coupler, in accordance with some embodiments. Diagrams 100a and 100b may show a portion of a silicon photonic integrated circuit (IC) or a standalone chip that may be, in non-limiting examples, one or more of a silicon photonic transmitter, receiver, SOA, or sensor. Diagram 100a shows a top-down view, taken at a cross section 102 as shown in diagram 100b. A Si rib 104 that contains a waveguide 104a may be coupled with an SOA Mesa 106. In embodiments, the SOA Mesa 106 may include III-V material that includes active light amplification material coupled with the waveguide 104. Specifically, the active light amplification material may include a combination of elements in group III of the periodic table (e.g., aluminum, gallium, indium, etc.) and elements in group V of the periodic table (e.g., phosphorous, arsenic, antimony, etc.) For example, the III-V compounds may include gallium nitride (GaN), gallium arsenide (GaAs), indium phosphide (InP), aluminum arsenide (AlAs), various combinations of the elements or compounds (e.g., InGaAsP, InAlGaAs, etc.), or some other III-V compound. In some embodiments, the active light amplification material may include glass, ceramic, or some other material. In some embodiments the active light amplification material may include various layers of the above compounds or some other type of gain material. The waveguide 104 may include, for example silicon oxide, silicon nitride, SiON. It will be understood that the above described example elements are intended as a non-exhaustive grouping of examples, and other embodiments may include additional or alternative materials, compounds, or elements to those listed above as will be understood as appropriate in the art. The SOA Mesa 106 may be bonded on-die onto the Si rib 104. At either end of the SOA Mesa 106 are taper couplers 108a, 108b which, in embodiments, may include III-V material. In embodiments, light from a laser beam such as laser beam 110 of diagrams 100a and 100b may travel along the waveguide 104a in either direction to and/or from the taper couplers 108a, 108b.

The taper couplers 108a, 108b facilitate the transition and/or couple the light of the laser beam 110 to and from the waveguide 104a in the Si rib 104 and the SOA Mesa 106. As shown in diagram 100b, the SOA Mesa 106 may include multiple quantum wells (MQW) 112. In embodiments, the SOA Mesa 106 amplifies the power of the laser through the length of the III-V MQW, which may include InP, for laser signal gain. The Si rib 104 may be layered onto a box silicon dioxide (SiO2) layer 105, which may be layered on a silicon substrate 107.

When constructing a tip at the end of taper coupler 108a, 108b, particularly when using III/V material, it is difficult to get the taper less than 0.6 μm due to limitations of the photolithographic tool and process. As a result, the tip at the end of the taper coupler 108a, 108b is a flat surface with a minimum diameter of about 0.6 μm. Due to the optical mode transitions through the tip at the end of the taper coupler 108a, 108b from Si to III-V, there is mode mismatch at the III-V taper tip due to the taper tip width if the flat taper tip is struck by the laser beam. For example, the flat taper tip during the mode coupling from Si to III-V may cause a high back-reflection to the laser, which is integrated on the same chip when the flat taper tip is in the light waveguide 104a. The back-reflection field induced by the latter is further amplified by the SOA gain.

In a light transmission direction, a laser 110 has light with optical power $P_{in}$ launched into a Si rib waveguide 104 that couples into a front-taper coupler 108a, that couples the light from the Si rib 104 to a boned III-V MQW in SOA mesa 106. The SOA 106 amplifies the power through the length of III-V MQW InP gain. At the end of SOA 106, a back-taper coupler 108b couples light back from III-V to Si waveguide 104. Both front-taper coupler 108a and the back-taper coupler 108b with slowly changing width performs light adiabatic transition from Si to III-V and from III-V MQWs to Si waveguide.

The SOA element 106 has an intensity gain G. For example G can typically range from 2 to 100 times. At the end of SOA 106, the output optical power $P_{out}$ is $G*P_{in}$, which is ~2 to 100 times the higher power being amplified by the SOA 106.

In legacy implementations where taper couplers 108a, 108b tips intersect the laser 110, each material interface point, including the flat tip of the taper coupler, causes light back reflection towards the source of the laser 110. Back-reflected field from the back-taper coupler tip: $\vec{E}_{SOA\_BT}$. Back-reflected field from the front-taper coupler tip: $\vec{E}_{SOA\_FT}$. SOA gain in field gain: $\vec{Gfld}$.

There may be two taper couplers in one SOA chip: the front-taper coupler 108a and the back-taper coupler 108b. The back-reflection field induced by the latter, which is $\vec{E}_{SOA\_BT}$ is reflected back through SOA 106 and further is amplified by the SOA gain $\vec{Gfld}$, then it becomes $\vec{Gfld}*\vec{E}_{SOA\_BT}$. The amplified, back-reflected fields from the back-taper coupler adds coherently with the back reflected field from the front-taper couplers, i.e., $\vec{E}_{SOA\_FT}+\vec{Gfld}*\vec{E}_{SOA\_BT}$. Thus, total coherent reflected fields from the two taper couplers travels back to the laser 110 source and may affect laser stability.

Figure 2A:
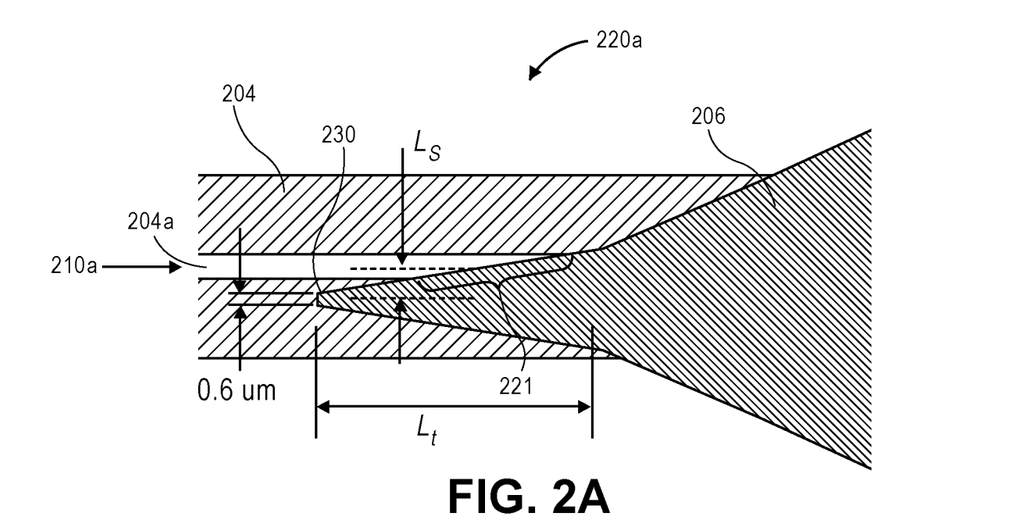
FIG. 2A illustrates a first example of a tapered coupler having a tip outside of a laser waveguide, in accordance with some embodiments.

FIG. 2A illustrates a first example of a tapered coupler having a tip outside of a laser waveguide, in accordance with some embodiments. This first example of a low back reflection taper coupler 220a may be referred to as an optimal shifted asymmetrical single taper coupler. As shown, the tip 230 that is a portion of the III/V Mesa 206, which may be similar to the III/V Mesa 106 of FIG. 1, is positioned outside of, or offset or shifted, from the waveguide 204a, which may be similar to waveguide 104a of FIG. 1. Accordingly, as shown in FIG. 2A, the laser 210a, which may be similar to laser 110 of FIG. 1, hits the surface along location 221 of the coupler, disposed at a non-perpendicular angle with respect to a direction of the laser 210a. Note that the tip 230, due to manufacturing challenges as discussed above, has a tip width of about 0.6 μm. In this way, the light of the laser 210a, will not encounter the tip 230 or its width, and therefore not cause any back reflection as the light enters the III/V Mesa 206.

Figure 2B:
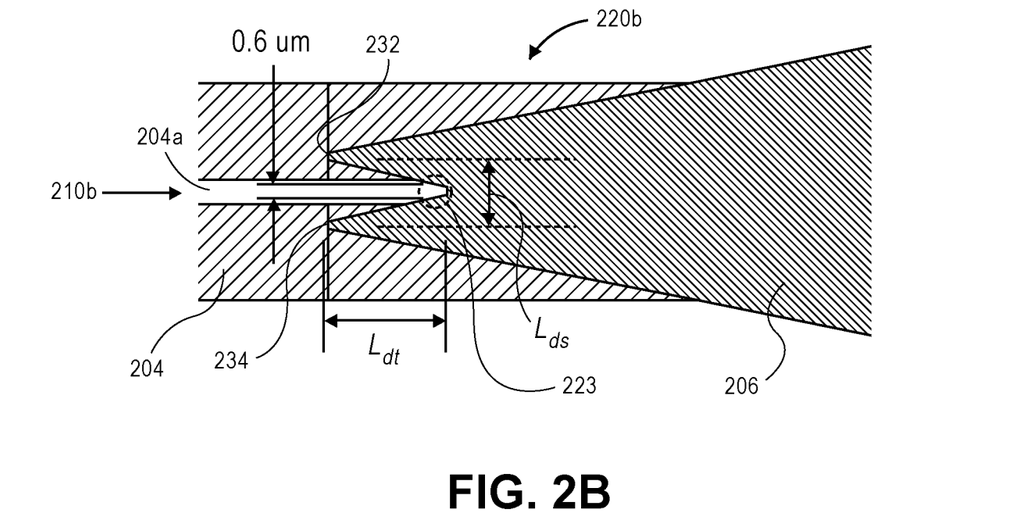
FIG. 2B illustrates a second example of a tapered coupler having multiple tips outside of a laser waveguide, in accordance with some embodiments.

FIG. 2B illustrates a second example of a tapered coupler having multiple tips outside of a laser waveguide, in accordance with some embodiments. The second example of low back reflection taper coupler 220b may be referred to as a dual-taper coupler, composed of two inversely and latterly tapered III/V waveguides. As shown, the tips 232, 234 that are a portion of the III/V Mesa 206, are positioned outside of, or offset or shifted, from the waveguide 204a, which may be similar to waveguide 104a of FIG. 1. Accordingly, the laser beam 210b provided in the waveguide 204a avoids the tips 232 and 234. Note that the tips 232, 234, have tip widths of about 0.6 μm.

Elimination of the tips at 232 and 234 may enable the mode mismatch to vanish at surface 223. When the laser beam 210b propagates through tips 232 and 234, and couples along the doubled taper couplers lengths of Ldt, the single mode size increases adiabatically. When light reaches at the surface location 223, the enlarged mode enables the mode mismatch to vanish equivalently at the surface 223. Thus, it is possible to avoid the complete reflections at the taper couplers to the SOA gain or laser region.

With respect to FIGS. 2A and 2B, to maintain the same adiabatic power transfer into the fundamental mode of the output waveguide, the tip-less taper design needs to consider taper coupler tip width shifts (Ls, Lds) and taper length (Lt) so as to minimize excitation of high order modes (HOM) during the Si 204 to III-V 206 interface transition.

In embodiments, optimization of taper coupler tip width shifts (Ls, Lds) and taper length (Lt, Ldt) in both asymmetrical FIG. 2A or symmetrical-double taper structures FIG. 2B can further minimize the coupler loss and suppress low back reflections. For example, Ls, Lds may be less than approximately a few microns so that the optical mode at the interface between Si and III-V is confined adiabatically from the lower portion of the Si waveguide to the upper portion of III-V, similar to how the mode would be confined in III-V Mesa. This design may favor both low transmission loss and low back reflection at Si-III/V interface in some embodiments. It should be noted that the term "tip-less" is used to emphasize that the "tip" feature is absent from the optical path, therefore it is possible to maintain the physical presence of a "tip" feature required by photolithographic process, so long as it is moved sufficiently far away from the optical path to not induce reflection.

Figure 3:
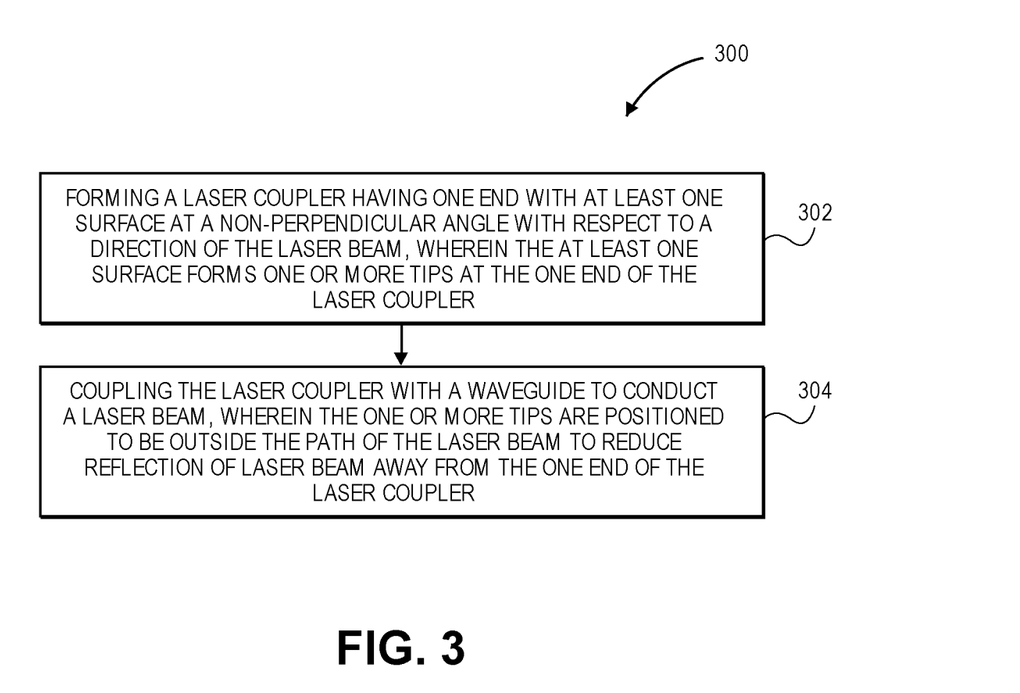
FIG. 3 is a flow diagram illustrating an example of a process to implement a tapered coupler for low back reflection, in accordance with some embodiments.

In embodiments, taper coupler tip width shifts (Ls, Lds) and taper length (Lt, Ldt) optimization also depends on Si rib waveguide height and rib etch depth, as well as III-V InP Mesa 306 dimensions. In some cases, the design may push the single mode toward its cutoff condition for a waveguide of the same height where the width of the waveguide is equivalently wider, such as to widen the tip width shifts (Ls, Lds) and reduce the taper length (Lt, Ldt). This may avoid the complete reflections at the tapers to the gain or laser region. In embodiments, these designs may be implemented through a straightforward mask change and may require no process change in III-V the taper mesa mask and etching process.

FIG. 3 is a flow diagram illustrating an example of a process to implement a tapered coupler for low back reflection, in accordance with some embodiments.

At block 302, the process may include forming a laser coupler having one end with at least one surface at a non-perpendicular angle with respect to a direction of the laser beam, wherein the at least one surface forms one or more tips at the one end of the laser coupler. As noted, the laser coupler may be made of a III/V material, and may be part of a SOA such as SOA 206 of FIGS. 2A, 2B.

At block 304, the process may include coupling the laser coupler with a waveguide to conduct a laser beam, wherein the one or more tips are positioned to be outside the path of the laser beam to reduce reflection of laser beam away from the one end of the laser coupler. In embodiments, the waveguide may be a Si waveguide such as Si waveguide 204a of FIGS. 2A, 2B. In embodiments, there may be a single tip 230 as shown in FIG. 2A, or a double tip 232, 234 as shown in FIG. 2B.

Figure 4:
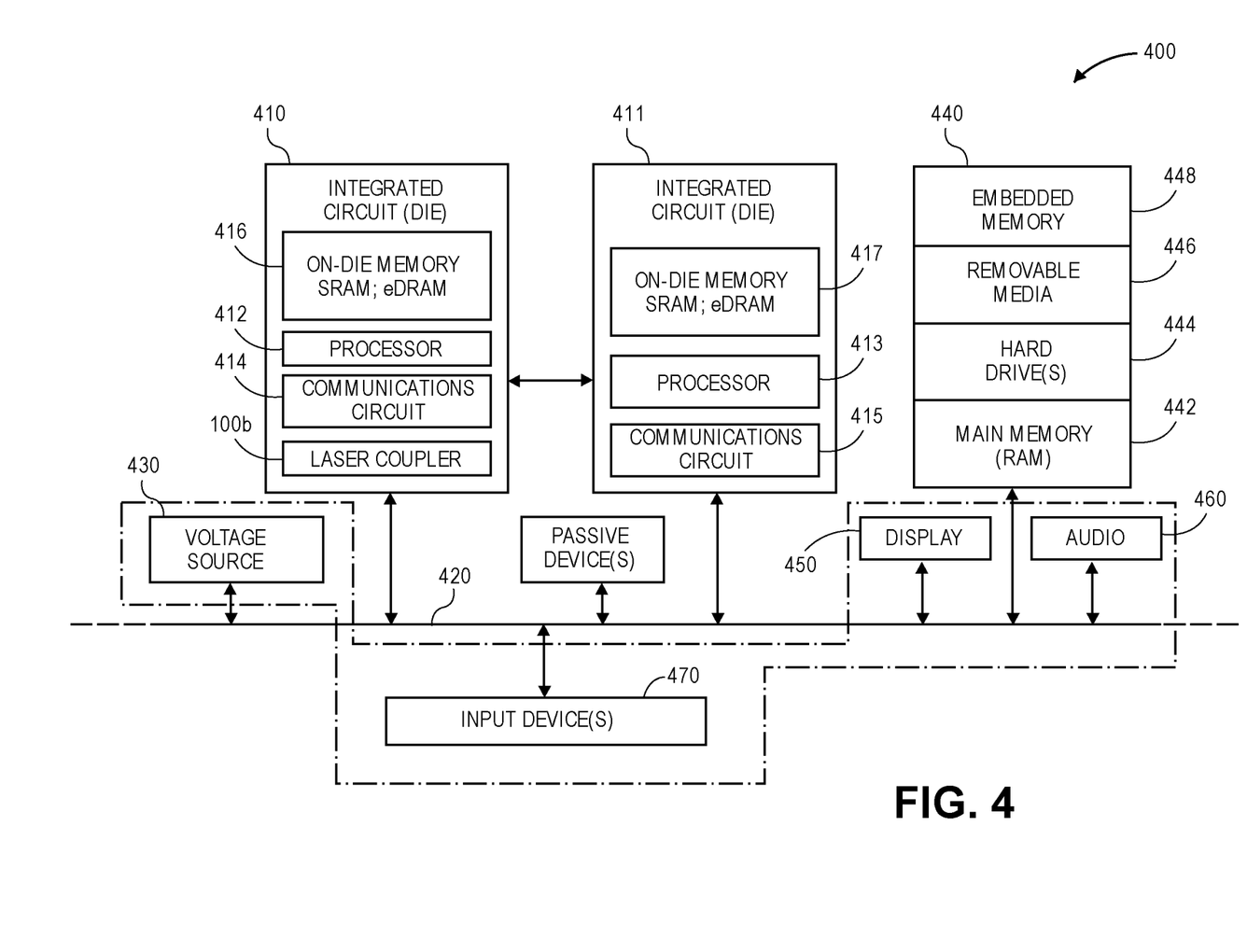
FIG. 4 is a schematic of a computer system 400, in accordance with some embodiments.

FIG. 4 is a schematic of a computer system 400, in accordance with some embodiments. The computer system 400 (also referred to as the electronic system 400) as depicted can embody a low back reflection taper laser coupler, according to any of the several disclosed embodiments and their equivalents as set forth in this disclosure. The computer system 400 may be a mobile device such as a netbook computer. The computer system 400 may be a mobile device such as a wireless smart phone. The computer system 400 may be a desktop computer. The computer system 400 may be a hand-held reader. The computer system 400 may be a server system. The computer system 400 may be a supercomputer or high-performance computing system.

In an embodiment, the electronic system 400 is a computer system that includes a system bus 420 to electrically couple the various components of the electronic system 400. The system bus 420 is a single bus or any combination of busses according to various embodiments. The electronic system 400 includes a voltage source 430 that provides power to the integrated circuit 410. In some embodiments, the voltage source 430 supplies current to the integrated circuit 410 through the system bus 420.

The integrated circuit 410 is electrically coupled to the system bus 420 and includes any circuit, or combination of circuits according to an embodiment. In an embodiment, the integrated circuit 410 includes a processor 412 that can be of any type. As used herein, the processor 412 may mean any type of circuit such as, but not limited to, a microprocessor, a microcontroller, a graphics processor, a digital signal processor, or another processor. In an embodiment, the processor is coupled with her coupled by a low back reflection taper laser coupler as disclosed herein. In an embodiment, SRAM embodiments are found in memory caches of the processor. Other types of circuits that can be included in the integrated circuit 410 are a custom circuit or an application-specific integrated circuit (ASIC), such as a communications circuit 414 for use in wireless devices such as cellular telephones, smart phones, pagers, portable computers, two-way radios, and similar electronic systems, or a communications circuit for servers. In an embodiment, the integrated circuit 410 includes on-die memory 416 such as static random-access memory (SRAM). In an embodiment, the integrated circuit 410 includes embedded on-die memory 416 such as embedded dynamic random-access memory (eDRAM). In embodiments, the communications circuit 414 may be coupled with a low back reflection taper coupler 100b to implement all or a portion of the functionality described with respect to FIGS. 1-2.

In an embodiment, the integrated circuit 410 is complemented with a subsequent integrated circuit 411. Useful embodiments include a dual processor 413 and a dual communications circuit 415 and dual on-die memory 417 such as SRAM. In an embodiment, the dual integrated circuit 410 includes embedded on-die memory 417 such as eDRAM.

In an embodiment, the electronic system 400 also includes an external memory 440 that in turn may include one or more memory elements suitable to the particular application, such as a main memory 442 in the form of RAM, one or more hard drives 444, and/or one or more drives that handle removable media 446, such as diskettes, compact disks (CDs), digital variable disks (DVDs), flash memory drives, and other removable media known in the art. The external memory 440 may also be embedded memory 448 such as the first die in a die stack, according to an embodiment.

In an embodiment, the electronic system 400 also includes a display device 450, an audio output 460. In an embodiment, the electronic system 400 includes an input device such as a controller 470 that may be a keyboard, mouse, trackball, game controller, microphone, voice-recognition device, or any other input device that inputs information into the electronic system 400. In an embodiment, an input device 470 is a camera. In an embodiment, an input device 470 is a digital sound recorder. In an embodiment, an input device 470 is a camera and a digital sound recorder.

As shown herein, the integrated circuit 410 can be implemented in a number of different embodiments, including a package substrate having a low back reflection taper laser coupler according to any of the several disclosed embodiments and their equivalents, an electronic system, a computer system, one or more methods of fabricating an integrated circuit, and one or more methods of fabricating an electronic assembly that includes a package substrate having a low back reflection taper laser coupler, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates having a low back reflection taper laser coupler embodiments and their equivalents. A foundation substrate may be included, as represented by the dashed line of FIG. 4. Passive devices may also be included, as is also depicted in FIG. 4.

The following are examples:

Example 1 is an apparatus for laser coupling, comprising: a taper coupler with one end to receive a laser beam, wherein the one end of the taper coupler has at least one surface at a non-perpendicular angle with respect to a direction of the laser beam, wherein the at least one surface forms one or more tips at the one end of the taper coupler, wherein the taper coupler is to receive the laser beam at the at least one surface and outside of the one or more tips, to reduce reflection of the laser beam away from the one end of the taper coupler.

Example 2 may include the apparatus of example 1, further comprising a waveguide coupled with the one end of the taper coupler to guide the laser beam.

Example 3 may include the apparatus of example 2, wherein the waveguide includes a silicon (Si) rib, wherein the taper coupler in a shifted position relative to the Si rib.

Example 4 may include the apparatus of example 1, wherein the taper coupler includes III-V material.

Example 5 may include the apparatus of example 1, wherein the taper coupler is a semiconductor optical amplifier (SOA).

Example 6 may include the apparatus of example 1, wherein the taper coupler includes indium phosphide (InP).

Example 7 may include the apparatus of example 1, wherein the taper coupler includes a multi quantum well (MQW).

Example 8 may be a method for laser coupling, comprising: forming a taper coupler having one end with at least one surface at a non-perpendicular angle with respect to a direction of the laser beam, wherein the at least one surface forms one or more tips at the one end of the laser coupler; and coupling the taper coupler with a waveguide to conduct a laser beam, wherein the one or more tips are positioned to be outside the path of the laser beam to reduce reflection of laser beam away from the one end of the laser coupler.

Example 9 may include the method of example 8, wherein the waveguide includes a Si rib.

Example 10 may include the method of example 8, wherein the taper coupler includes III-V material.

Example 11 may include the method of example 8, wherein the taper coupler is a SOA.

Example 12 may include the method of example 8, wherein the taper coupler includes InP.

Example 13 may include the method of example 8, wherein the taper coupler includes a MQW.

Example 14 may include the method of example 8, wherein the taper width shifts (Ls, Lds) are between approximately 0.5 μm to approximately 6 μm and wherein taper length (Ls, Lds) are between approximately 1 μm and approximately 200 microns μm.

Example 15 may be an integrated circuit comprising: a taper coupler with one end to receive a laser beam, wherein the one end of the taper coupler has at least one surface at a non-perpendicular angle with respect to a direction of the laser beam, wherein the at least one surface forms one or more tips at the one end of the taper coupler, wherein the taper coupler is to receive the laser beam at the at least one surface and outside of the one or more tips, to reduce reflection of the laser beam away from the one end of the taper coupler; and a waveguide to couple with the one end of the taper coupler.

Example 16 may include the integrated circuit of example 15, wherein the integrated circuit is a part of a computing device.

Example 17 may include the integrated circuit of example 16, wherein the waveguide includes a Si rib.

Example 18 may include the integrated circuit of example 16, wherein the laser coupler includes III-V material.

Example 19 may include the integrated circuit of example 16, wherein the laser coupler is a SOA.

Example 20 may include the integrated circuit of example 16, wherein the laser coupler includes InP.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

What is claimed is:

1. An apparatus, comprising:
   a taper coupler having a mesa with a tapered end to receive a laser beam, wherein the tapered end of the taper coupler includes a surface at a non-perpendicular angle with respect to a direction of the laser beam, and a tip that extends from the surface at a perpendicular angle with respect to the direction of the laser beam; and
   a waveguide coupled with the tapered end of the taper coupler at the non-perpendicular angled surface and shifted away from the tapered coupler tip, to guide the laser beam to the taper coupler, wherein the taper coupler is to receive the laser beam from the waveguide at the non-perpendicular angled surface and outside of the taper tip, such that the taper tip is absent from an optical path of the laser beam, to reduce reflection of the laser beam at the taper coupler.

2. The apparatus of claim 1, wherein the apparatus comprises an integrated circuit.

3. The apparatus of claim 2, wherein the waveguide includes a silicon (Si) rib, wherein the taper coupler is disposed in a shifted position relative to the Si rib.

4. The apparatus of claim 1, wherein the taper coupler includes III-V material.

5. The apparatus of claim 1, wherein the taper coupler is a semiconductor optical amplifier (SOA).

6. The apparatus of claim 1, wherein the taper coupler includes indium phosphide (InP).

7. The apparatus of claim 1, wherein the taper coupler includes a multi quantum well (MQW).

8. A method for laser coupling, comprising:
   forming a taper coupler having a mesa with a tapered end with at least one surface on the tapered end provided at a non-perpendicular angle with respect to a direction of a laser beam to be received by the taper coupler, and a tip that extends from the surface at a perpendicular angle with respect to the direction of the laser beam; and
   coupling the taper coupler with a waveguide to conduct a laser beam, which includes attaching the waveguide at the non-perpendicular angled surface, including shifting the waveguide away from the tapered coupler tip, wherein the taper coupler is to receive the laser beam from the waveguide at the non-perpendicular angled surface and outside of the taper tip, such that the taper tip is absent from an optical path of the laser beam, to reduce reflection of laser beam at the taper coupler.

9. The method of claim 8, wherein the waveguide includes a silicon (Si) rib.

10. The method of claim 8, wherein the taper coupler includes III-V material.

11. The method of claim 8, wherein the taper coupler is a semiconductor optical amplifier (SOA).

12. The method of claim 8, wherein the taper coupler includes indium phosphide (InP).

13. The method of claim 8, wherein the taper coupler includes a multiple quantum well (MQW).

14. The method of claim 8, wherein a width of the taper coupler is about 6 μm.

15. An integrated circuit comprising:
   a taper coupler having a mesa with a tapered end to receive a laser beam, wherein the tapered end of the taper coupler includes a first tapered portion with a first tip that is formed at an end of the first tapered portion, and a second tapered portion with a second tip that is formed at an end of the second tapered portion, wherein the first tapered portion is coupled with the second tapered portion via a surface disposed between the first and second tapered portions, wherein the surface is to receive the laser beam; and a waveguide coupled with the tapered end of the taper coupler at the surface between the first and second tapered portions of the taper coupler, wherein the taper coupler is to receive the laser beam from the waveguide at the surface and outside of the first and second taper tips, such that the first and second taper tips are absent from an optical path of the laser beam, to reduce reflection of the laser beam at the taper coupler.

16. The integrated circuit of claim 15, wherein the integrated circuit is a part of a computing device.

17. The integrated circuit of claim 16, wherein the waveguide includes a silicon rib.

18. The integrated circuit of claim 16, wherein the taper coupler includes III-V material.

19. The integrated circuit of claim 16, wherein the taper coupler is a semiconductor optical amplifier (SOA).

20. The integrated circuit of claim 16, wherein the taper coupler includes indium phosphide (InP).

* * * * *